United States Patent
Pflueger et al.

(10) Patent No.: US 10,808,660 B2
(45) Date of Patent: Oct. 20, 2020

(54) WATER SEPARATION ELEMENT COMPRISING A SUPPORT PIECE

(71) Applicant: MANN+HUMMEL GmbH, Ludwigsburg (DE)

(72) Inventors: Frank Pflueger, Sachsenheim (DE); Idriss Razgani, Ludwigsburg (DE); Martin Veit, Gaertringen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 251 days.

(21) Appl. No.: 15/890,615

(22) Filed: Feb. 7, 2018

(65) Prior Publication Data

US 2018/0163680 A1   Jun. 14, 2018

Related U.S. Application Data

(63) Continuation of application No. PCT/EP2016/063530, filed on Jun. 13, 2016.

(30) Foreign Application Priority Data

Aug. 7, 2015 (DE) .................. 10 2015 010 082

(51) Int. Cl.
*B01D 25/00* (2006.01)
*F02M 37/24* (2019.01)
(Continued)

(52) U.S. Cl.
CPC ............. *F02M 37/24* (2019.01); *B01D 29/13* (2013.01); *B01D 36/003* (2013.01);
(Continued)

(58) Field of Classification Search
CPC ...... B01D 25/00; B01D 25/001; B01D 25/02; B01D 25/04; B01D 25/08; B01D 27/00;
(Continued)

(56) References Cited

U.S. PATENT DOCUMENTS 4,618,422 A   10/1986  Sasaki et al.
5,423,893 A * 6/1995  Kotaki ................ B01D 29/012
                                              55/511
(Continued)

FOREIGN PATENT DOCUMENTS

DE   202006011264 U1   10/2006
DE   202011002684 U1    5/2012
(Continued)

*Primary Examiner* — Allison G Fitzsimmons
(74) *Attorney, Agent, or Firm* — James Hasselbeck

(57) ABSTRACT

A water separation element is provided with a cylindrical woven fabric screen for separating water. The woven fabric screen is made of woven fabric yarns positioned angularly relative to each other. A first annular support piece is arranged at a first end face of the woven fabric screen and is fixedly connected to a rim area of the woven fabric screen. The first annular support piece has a lateral edge facing the woven fabric screen. The woven fabric screen is flowed through in radial direction. The woven fabric yarns of the woven fabric screen are positioned, at least over sections, at an angle greater than 0° and smaller than 90° relative to the facing lateral edge of the first annular support piece. A second annular support piece is connected to the second end face. A filter element and a filter device with such a water separation element are provided.

19 Claims, 3 Drawing Sheets

(51) Int. Cl.
  *B01D 36/00* (2006.01)
  *B01D 29/13* (2006.01)
  *B01D 39/08* (2006.01)
  *F02M 37/22* (2019.01)

(52) U.S. Cl.
  CPC .... *B01D 39/083* (2013.01); *B01D 2201/0423* (2013.01); *B01D 2201/291* (2013.01)

(58) Field of Classification Search
  CPC ...... B01D 27/005; B01D 27/04; B01D 27/06; B01D 27/07; B01D 27/08; B01D 29/00; B01D 29/002; B01D 29/0093; B01D 29/0097; B01D 29/01; B01D 29/014; B01D 29/16; B01D 29/03; B01D 29/035; B01D 29/05; B01D 35/00; B01D 35/005; B01D 35/30; B01D 35/301; B01D 35/308; B01D 39/00; B01D 39/10; B01D 39/12; B01D 39/14; B01D 2201/00; B01D 2201/04; B01D 2201/0415; B01D 2201/0423; B01D 2201/30; B01D 2201/301; B01D 2201/306; B01D 2201/307; B01D 2201/31; B01D 2239/00; B01D 2239/06; B01D 2265/00; B01D 2265/02; B01D 2265/06; B01D 2313/00; B01D 2313/06; B01D 2313/20; B01D 2313/21; B01D 2319/00; F02M 37/24; F02M 37/22
  USPC .. 210/153, 232, 233, 321.6, 321.84, 321.87, 210/348, 457, 435, 473, 474, 477, 481, 210/482, 483, 484, 485, 488, 499, 500.1, 210/500.21, 500.27
  See application file for complete search history.

(56) References Cited

U.S. PATENT DOCUMENTS

| | | | |
|---|---|---|---|
| 2011/0259796 A1* | 10/2011 | Chen | B01D 29/232 208/187 |
| 2012/0318728 A1 | 12/2012 | Eberle et al. | |
| 2013/0146523 A1 | 6/2013 | Veit et al. | |

FOREIGN PATENT DOCUMENTS

| | | |
|---|---|---|
| DE | 102013018199 A1 | 4/2015 |
| JP | 2004130253 A | 4/2004 |
| WO | 2013083309 A1 | 6/2013 |

\* cited by examiner

WATER SEPARATION ELEMENT COMPRISING A SUPPORT PIECE

CROSS-REFERENCE TO RELATED APPLICATIONS

This application is a continuation application of international application No. PCT/EP2016/063530 having an international filing date of 13 Jun. 2016 and designating the United States, the international application claiming a priority date of 7 Aug. 2015, based on prior filed German patent application No. 10 2015 010 082.3, the entire contents of the aforesaid international application and the aforesaid German patent application being incorporated herein by reference.

TECHNICAL FIELD

The invention concerns a water separation element comprising a woven fabric screen for separating water.

BACKGROUND OF THE INVENTION

DE 20 2006 011 264 U1 discloses a filter element for oil and emulsion separators with which oil and emulsion droplets contained in a gaseous fluid can be separated. The filter element comprises a woven fabric screen that is embodied as a flat woven fabric strip which is framed by lateral frame parts. The medium to be purified flows into the woven fabric screen parallel to the lateral frame parts wherein the inflow side as well as the outflow side of the woven fabric screen are arranged at an angle that is not equal to 90° relative to the flow direction of the medium to be purified. Due to the angular arrangement, contaminants may deposit at the lower part of the woven fabric screen.

SUMMARY OF THE INVENTION

The invention has the object to embody a water separation element that is provided with a woven fabric screen for separating water, in a stable way with simple constructive measures.

This object is solved according to the invention in that the water separation element comprises a woven fabric screen for separating water, constructed of woven fabric yarns positioned angularly relative to each other, and further comprises at least one support piece with which the rim area of the woven fabric screen is fixedly connected, wherein the woven fabric screen is cylindrically embodied and can be flowed through in radial direction, wherein the annularly formed support piece is arranged at an end face of the woven fabric screen, wherein the woven fabric yarns of the woven fabric screen, at least over sections thereof, are positioned at an angle greater than 0° and smaller than 90° relative to the facing lateral edge of the support piece.

The dependent claims provide expedient further embodiments.

The water separation element according to the invention can be used in a liquid filter, for example, in an oil or fuel filter, wherein the woven fabric screen of the water separation element is employed for separating water, for example, the water components contained in fuel. The woven fabric screen of the water separation element is cylindrically embodied and is flowed through in radial direction by the fluid to be purified. The water separation element with the woven fabric screen is used as one of a plurality of filtration stages in a filter element of a filter device, in particular as a final separator at the clean side of the filter element. Also possible is however a use of the water separation element with the woven fabric screen as a sole filtration stage in a filter device.

The woven fabric screen, at which the water separation is taking place and which is comprised preferably of a hydrophobic material, is constructed of woven fabric yarns that are embodied straight and are positioned angularly to each other. In this way, the net-like structure of the woven fabric screen results. There are in particular first woven fabric yarns which extend parallel to each other as well as second woven fabric yarns that also extend parallel to each other, wherein the first and the second woven fabric yarns are arranged angularly relative to each other. The angle between the first and the second woven fabric yarns preferably amounts to 90° wherein, as needed, also an angle deviating therefrom is possible. The woven fabric yarns are, for example, warp yarns and weft yarns.

In the region of at least one end face, the cylindrical woven fabric screen is arranged at an annular support piece. The first and/or the second woven fabric yarns of the woven fabric screen are positioned angularly relative to the facing lateral edge of the annular support piece, wherein the angle is greater than 0° and smaller than 90°.

This angular arrangement between the woven fabric yarns of the woven fabric screen and the lateral edge of the support piece to which the woven fabric screen is connected has the advantage that the woven fabric screen, in comparison to embodiments of the prior art with orthogonal or parallel orientation of the woven fabric yarns relative to the lateral edge, is exposed to reduced forces and has less of a tendency to tear. When the woven fabric screen is flowed through, shearing forces are generated due to the pressure load in radial direction at the support geometry, supporting the woven fabric screen at the end faces and, as needed, at longitudinal stays, and can lead to tears in the woven fabrics screen, in particular in the region of the connection of the woven fabric yarns to the annular support piece. Due to the angular orientation according to the invention between the lateral edge, where the connection to the woven fabric screen is realized, and the first and/or second woven fabric yarns of the woven fabric screen, the shearing forces are reduced so that also the risk of tearing of the woven fabric screen is reduced.

When the first and the second woven fabric yarns of which the woven fabric screen is constructed are positioned at an angle of 90° relative to each other, the first as well as the second woven fabric yarns are positioned at an angle of greater than 0° and less than 90° relative to the facing lateral edge of the support piece. In embodiments in which the woven fabric yarns are positioned relative to each other at an angle that is not equal to 90°, it is sufficient that either only the first or only the second woven fabric yarns of the woven fabric screen are positioned at an angle greater than 0° and smaller than 90° relative to the facing lateral edge of the support piece. Nonetheless, in this case there are also constellations in which the first and the second woven fabric yarns are positioned at an angle greater than 0° and smaller than 90° relative to the neighboring lateral edge of the support piece, respectively.

The connection between the woven fabric screen and the support piece is realized preferably in such a way that the woven fabric screen is embedded by an injection molding process into the support piece. It can be expedient that the woven fabric screen as well as the support piece are embodied as plastic components.

The woven fabric yarns are connected at least across a section of the circumference to the facing lateral edge of the support piece relative to which they are positioned at an angle greater than 0° and smaller than 90°. It can be sufficient to provide such an angular position between the woven fabric yarns and the neighboring lateral edge of the support piece only across a peripheral angle between 180° and less than 360°; as needed, a peripheral angle smaller than 180° but greater than 0°, in particular greater than 45°, preferably greater than 90°, may suffice. According to an advantageous embodiment, it is provided that across the entire peripheral angle of 360° the woven fabric yarns of the woven fabric screen are positioned at an angle greater than 0° and smaller than 90° relative to the facing lateral edge of the support piece, whereby it is ensured that an increased strength is ensured for any inflow direction toward the woven fabric screen.

According to a further advantageous embodiment, the angle between the woven fabric yarns and the lateral edge of the support piece is within an angle range between 45° and 75°. In this angle range, the shearing forces exhibit a minimum in the area of the connection of the woven fabric screen to the annular support piece.

According to a further expedient embodiment, the first woven fabric yarns extend parallel to the longitudinal axis of the water separation element, the second woven fabric yarns extend, in case of a 90° angle relative to the first woven fabric yarns, in circumferential direction of the cylindrical woven fabric screen. The angular orientation between the first woven fabric yarns extending in longitudinal axial direction and the facing lateral edge of the support piece in this case is realized by a corresponding geometric configuration of the lateral edge of the support piece. The lateral edge extends at least over sections thereof angularly relative to the circumferential direction. This also provides that the first woven fabric yarns of the woven fabric screen extending in the longitudinal axial direction are extending at an angle that deviates from 90°.

In an alternative embodiment, the woven fabric screen is positioned at a slant relative to the longitudinal axis of the water separating element so that the first woven fabric yarns as well as advantageously the second woven fabric yarns are positioned at an angle that is not equal to 90° relative to the longitudinal axis of the water separation element. In this case, it can be sufficient that the lateral edge of the support piece extends precisely in circumferential direction in order to obtain nevertheless an angle that is not equal to 90° between the first and, as needed, also the second woven fabric yarns and the lateral edge. Moreover, it is also possible in case of the woven fabric screen positioned at a slant that the facing lateral edge of the support piece is extending at an angle relative to the circumferential direction.

According to a further advantageous embodiment, the lateral edge of the support piece which is facing the woven fabric screen is comprised of several straight sections which each extend at an angle that is not equal to 90° relative to the longitudinal axis of the water separation element. In particular in the embodiment where the lateral edge of the support piece is positioned at an angle relative to the woven fabric yarns of the woven fabric screen about its entire circumference, it is expedient that the lateral edge facing the woven fabric screen is composed of several assembled straight sections about the entire circumference wherein two neighboring straight sections are positioned angularly relative to each other, respectively. In this way, in the developed state of the annular support piece, one obtains a zigzag-shaped lateral edge with individual straight sections. The straight sections advantageously have the same length; also, the angle between two neighboring sections can be of the same magnitude, respectively.

According to a further expedient embodiment, the cylindrical woven fabric screen is framed at its two axially opposed end faces by an annular support piece, respectively. The lateral edge of each support piece which is facing the woven fabric screen, respectively, is positioned relative to the woven fabric yarns at least over section thereof at an angle greater than 0° and smaller than 90°. Accordingly, the woven fabric screen at its two axially opposed end faces is connected angularly to the respective support piece so that the risk of damage by shearing forces is reduced at both end faces.

According to an advantageous embodiment, the two annular support pieces, at least in regard to the lateral edge neighboring the woven fabric screen, are embodied mirror-symmetrical to each other. This has the advantage that same or at least same type support pieces can be employed for both end faces of the woven fabric screen.

According to a further expedient embodiment, the two annular support pieces are configured on opposed end faces of the woven fabric screen such that the free axial length of the woven fabric screen that is available for the separation is at least approximately the same at every location about the circumference. This embodiment has the advantage that about the circumference a constant surface area that is available for the separation is provided at the woven fabric screen. In case that the two annular support pieces are embodied mirror-symmetrical to each other, they are arranged in particular so as to be displaced in circumferential direction relative to each other in order to ensure the same axial length at every circumferential location.

According to a further expedient embodiment, longitudinal stays are introduced into the support piece, in particular into the cylindrical woven fabric screen, and extend from end face to end face and in particular are connected with the support pieces, respectively. The longitudinal stays improve the stability of the woven fabric screen. Distributed about the circumference, several longitudinal stays can be introduced, for example, six or eight longitudinal stays. The woven fabric screen extends in circumferential direction between two neighboring longitudinal stays, respectively, and in axial direction between the support pieces. The longitudinal stays are comprised advantageously of a plastic material. Moreover, it is expedient that the longitudinal stays and the first or the second woven fabric yarns of the woven fabric screen extend parallel to each other, for example, parallel to the longitudinal axis of the water separation element.

It can be expedient to integrate the longitudinal stays into the woven fabric screen, in particular in such a way that the longitudinal stays are positioned, partially or completely, in radial direction within the cylindrical envelope of the woven fabric screen. This embodiment has the advantage that the longitudinal stays do not project, or at least only a minimal portion (main portion radial inward), in radial direction outwardly past the woven fabric screen, and a smooth-walled outer surface is formed.

The filter device that serves for receiving the water separation element comprises a filter housing which, as needed, may contain further filtration stages for filtration of the fluid. For example, it can be expedient to employ a multi-stage filter element in the filter device that comprises one or a plurality of filter medium bodies for particle filtration as well as a water separation element for water separation that represents preferably the last filtration stage in the filter element.

BRIEF DESCRIPTION OF THE DRAWINGS

Further advantages and expedient embodiments can be taken from the further claims, the figure description, and the drawings.

In the Figures, the same components are provided with same reference characters.

DETAILED DESCRIPTION OF THE DRAWINGS

Figure 1:
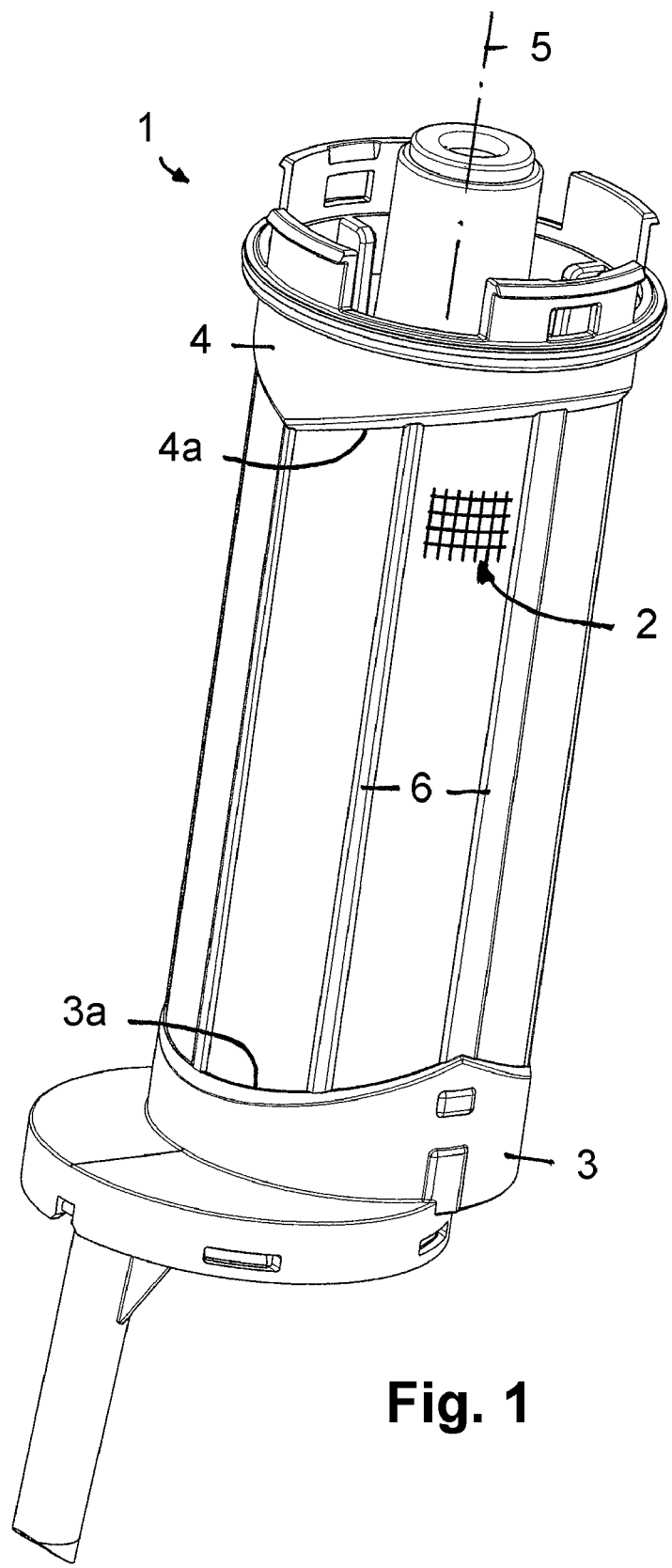
FIG. 1 shows in a perspective view a water separation element for a liquid filter comprising a cylindrical woven fabric screen for separating water that is framed at its opposed end faces by a support piece.

In FIG. 1, a water separation element for a liquid filter is illustrated that can be used for water separation, for example, for separation of water droplets from fuel. The water separation element 1 comprises a cylindrically shaped woven fabric screen 2 that with its two end faces is fixedly connected to an annular support piece 3, 4, respectively. The woven fabric screen 2 and the support pieces 3, 4 are comprised advantageously of plastic material.

Longitudinal stays 6 are introduced into the woven fabric screen 2 and extend parallel to the longitudinal axis 5 of the water separation element 1. Uniformly distributed about the circumference, a plurality of longitudinal stays 6 are arranged, for example, eight longitudinal stays 6. The longitudinal stays 6 and the woven fabric screen 2 are advantageously fixedly connected to each other; the woven fabric screen 2 is located between two neighboring longitudinal stays 6, respectively.

Figure 2:
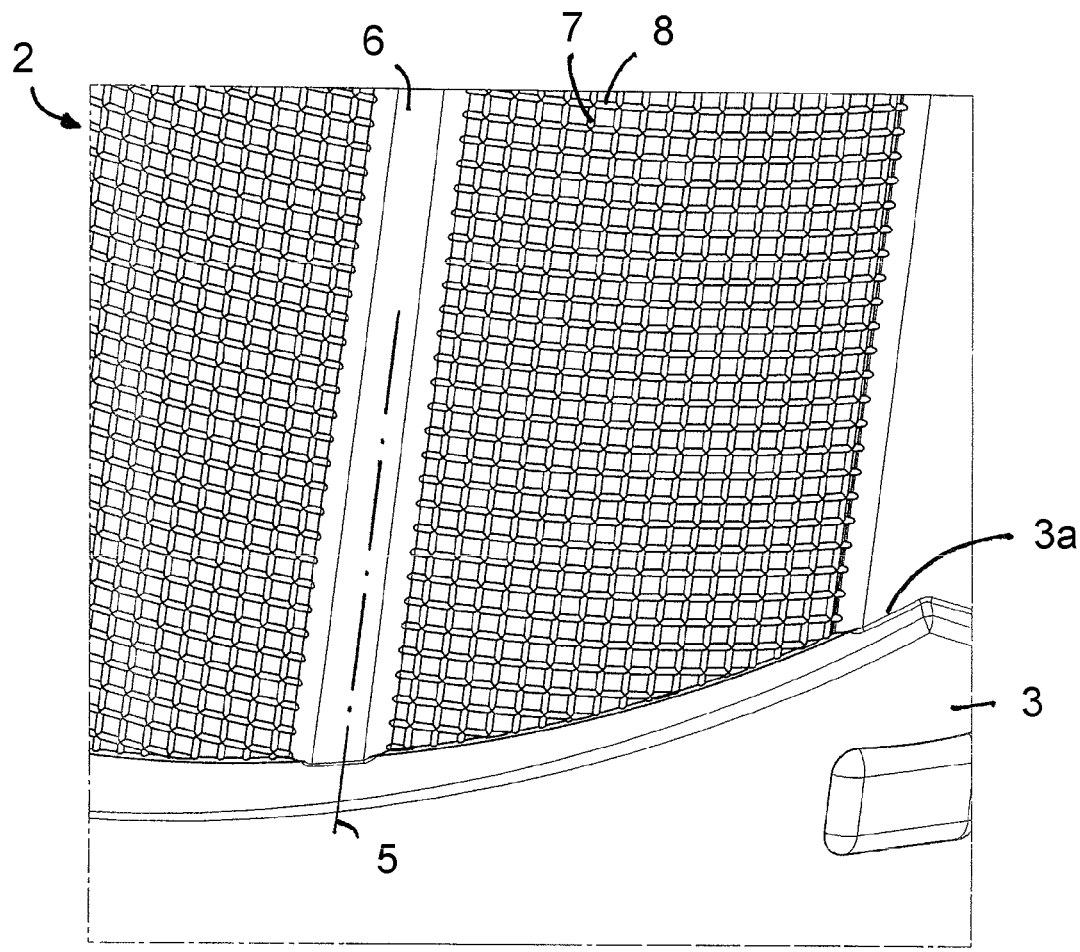
FIG. 2 shows in an enlarged illustration the woven fabric screen at the transition to a support piece.

As shown in FIG. 1 in connection with FIG. 2, the annular support pieces 3, 4, which are fixedly connected to the woven fabric screen 2 and the longitudinal stays 6, are provided on their side facing the woven fabric screen 2 with a lateral edge 3a or 4a, respectively, that relative to the longitudinal axis 5 of the water separation element 1 is positioned at an angle that is greater than 0° and smaller than 90°. The woven fabric screen 2 comprises first and second woven fabric yarns 7, 8 which like weft and warp form a net-shaped fabric, wherein the first woven fabric yarns 7 extend parallel to the longitudinal axis 5 of the water separation element and the second woven fabric yarns 8 extend in circumferential direction. In the region of the connection of the woven fabric screen 2 to the support pieces 3 and 4, both woven fabric yarns 7 and 8 are therefore positioned relative to the lateral edge 3a or 4a of the support piece 3 or 4 at an angle that is greater than 0° and smaller than 90°. In this way, it is ensured that for a radial flow through the woven fabric screen 2, in particular in radial direction from the exterior to the interior by the fluid to be purified, shearing forces in the region of the connection between the woven fabric screen 2 and the support pieces 3 and 4 are reduced so that also the risk of a tear in the woven fabric screen 2 is reduced.

The two axially opposed support pieces 3 and 4 are arranged, at least relative to their respective lateral edge 3a, 4a, mirror-symmetrical to each other but displaced relative to each other in circumferential direction. In this way, a free axial length of the woven fabric screen 2 results that is at least approximately identical at all locations about the circumference.

Figure 3:
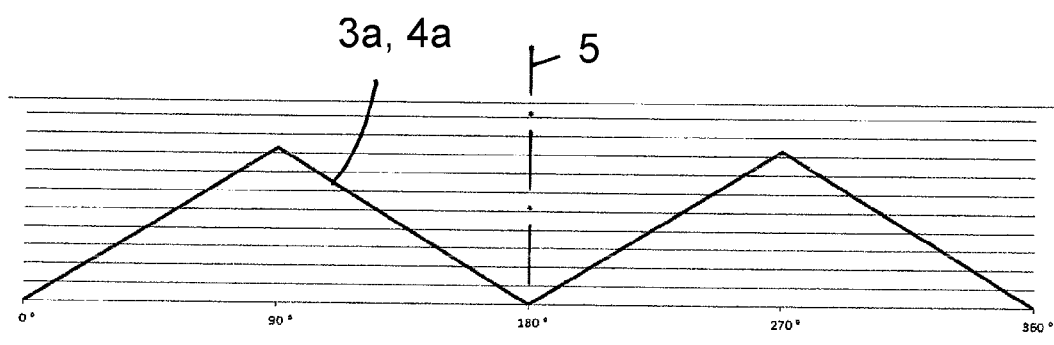
FIG. 3 shows the lateral edge of the support piece facing the woven fabric screen in a developed view in a plane.

FIG. 3 shows the lateral edge 3a, 4a of the support piece 3 or 4 in a developed flat state. The lateral edge 3a, 4a is comprised of individual straight sections which adjoin each other and are positioned at an angle relative to each other. Relative to the longitudinal axis 5 of the water separation element—and thus also relative to the first woven fabric yarns 7 of the woven fabric screen 2—each straight section of the lateral edge 3a, 4a is positioned at an angle whose absolute value is approximately 60°. The angle between two immediately adjoining sections of the lateral edge 3a, 4a amounts to approximately 120°. Distributed about the entire circumference of 360°, a total of four straight sections of identical length are provided so that each section extends about an angle segment of 90°.

Figure 4:
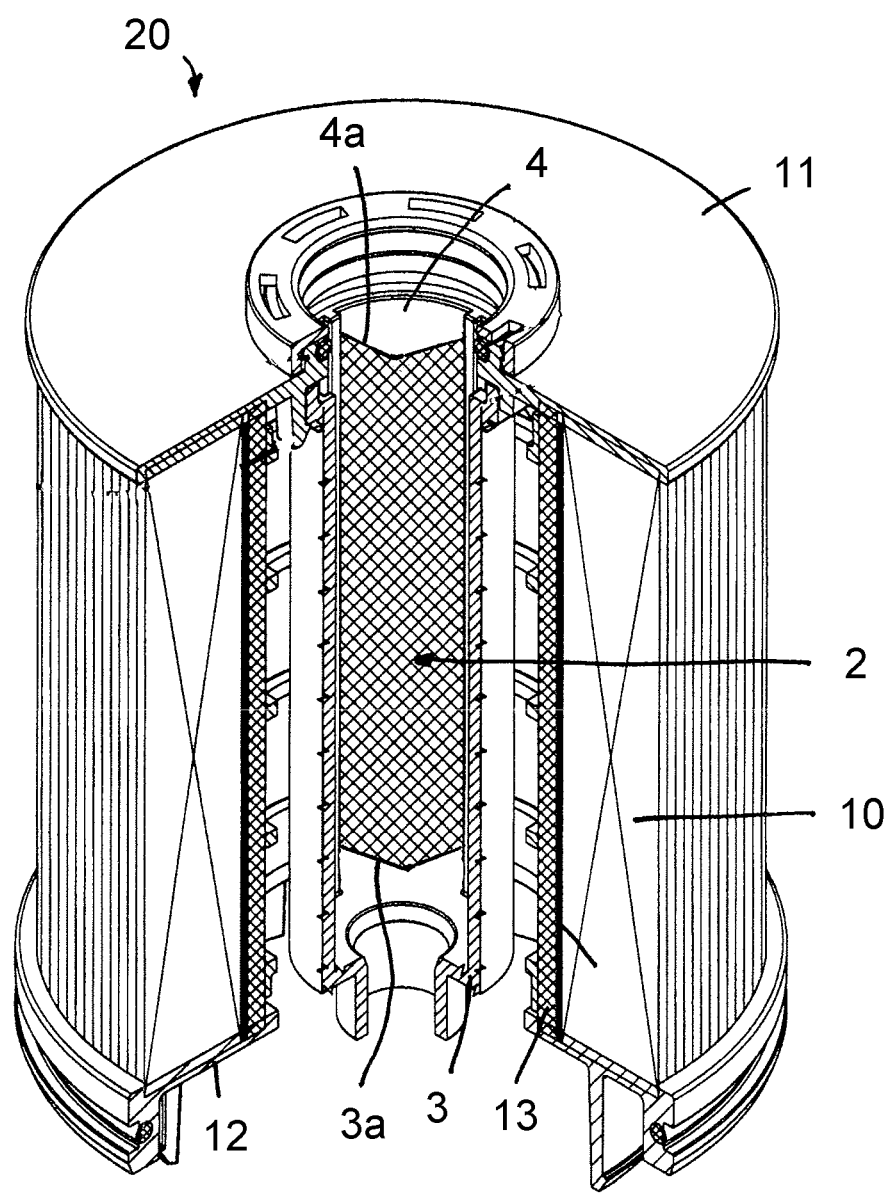
FIG. 4 shows in a perspective, partially sectioned view a filter element that comprises various filtration stages, wherein the last filtration stage is a water separation element with a woven fabric screen for separating water.

In FIG. 4, a filter element 20 is illustrated that comprises several filtration stages wherein the water separation element 1 with the cylindrical woven fabric screen 2 represents the inwardly positioned last filtration stage. The filter element 20 that is flowed through from the exterior to the interior comprises outwardly in radial direction a filter medium body 10 which is axially framed by end discs 11, 12 and embodied as a folded filter. On the radial inwardly positioned side, a support frame 13 is provided at the filter medium body 12 and provides stability to the filter medium body 10 and supports it. Between the support frame 13 and the filter medium body 10, a coalescing element 14 is provided where an agglomeration of finely divided water droplets which are dispersed in the fluid passing through is realized so that the water droplets combine to larger droplets.

The filter medium body 10 forms the first filtration stage, the coalescing element 14 the second filtration stage. Within the support frame 13, the woven fabric screen 2 is arranged that forms the third filtration stage. The woven fabric screen 2, as in the embodiment according to FIGS. 1 through 3, is framed in the region of its two axially opposed end faces by an annular support piece 3 or 4, respectively, whose lateral edge 3a or 4a extends angularly relative to the longitudinal axis of the filter element 20. The woven fabric yarns of which the woven fabric screen 2 is constructed are also positioned at an angle that is not equal to 90° relative to the lateral edges 3a and 4a.

What is claimed is:

1. A water separation element comprising:
   a cylindrical woven fabric screen for separating water, the cylindrical woven fabric screen surrounding and elongated along a longitudinal axis, the cylindrical woven fabric screen having a first axial end and a second axial end;
   wherein axial, as used herein, is a direction of the longitudinal axis;
   wherein radial, as used herein, is a direction transverse to the longitudinal axis;
   wherein the cylindrical woven fabric screen comprises woven fabric yarns positioned angularly relative to each other;
   a first annular support piece, arranged on and fixedly connected onto the first axial end of the cylindrical woven fabric screen,
   wherein the first annular support piece is circumferentially closed and has an annular end having an circumferentially closed a zig-zag shaped lateral edge spaced axially away from the first and second axial ends and extending about a circumference of the cylindrical woven fabric screen;

wherein the zig-zag shaped lateral edge of the first annular support piece is composed of several assembled lateral edge sections, adjacent ones of the lateral edge sections extending at a non-zero angle relative to each other, and wherein the lateral edge sections extend at an angle not equal to 90 degrees relative to the longitudinal axis, to form the zig-zag shape of the zig-zag shaped lateral edge;

wherein the cylindrical woven fabric screen is configured to be flowed through in a radial direction.

2. The water separation element according to claim 1, wherein
the lateral edge sections of the zig-zag shaped lateral edge of the first annular support piece is positioned relative to a longitudinal yarn direction of the woven fabric yarns in an angle range between 45° and 75°.

3. The water separation element according to claim 1, wherein
a longitudinal yarn direction of the woven fabric yarns is angularly positioned at non-zero angle relative to the zig-zag shaped lateral edge of the first annular support piece about an entire circumference of the cylindrical woven fabric screen.

4. The water separation element according to claim 1, wherein
the woven fabric yarns of the cylindrical woven fabric screen extend parallel or orthogonal to the longitudinal axis of the water separation element;
wherein adjacent ones of the lateral edge sections extend at a non-zero angle of 45° to 75° relative to the longitudinal axis, and wherein adjacent lateral edge sections each extend at different angles relative to the longitudinal axis, to form the zig-zag shape of the zig-zag shaped lateral edge.

5. The water separation element according to claim 4, wherein
the lateral edge sections of the first annular support piece are each straight sections that extend angularly relative to the longitudinal axis of the water separation element.

6. The water separation element according to claim 1, further comprising:
a second annular support piece, arranged on and fixedly connected onto the second axial end of the cylindrical woven fabric screen,
wherein the second annular support piece is circumferentially closed and has an annular end having a zig-zag shaped lateral edge spaced axially away from the first and second axial ends and extending about a circumference of the cylindrical woven fabric screen;
wherein the zig-zag shaped lateral edge of the second annular support piece is composed of several assembled lateral edge sections, adjacent ones of the lateral edge sections extending at a non-zero angle relative to each other, and wherein the lateral edge sections extend at an angle not equal to 90 degrees relative to the longitudinal axis, to form the zig-zag shape of the zig-zag shaped lateral edge of the second annular support piece.

7. The water separation element according to claim 6, wherein
the zig-zag shaped lateral edges of the first and second annular support pieces are mirror-symmetrical relative to each other.

8. The water separation element according to claim 7, wherein
the zig-zag shaped lateral edges of the first and second annular support pieces are formed such that a free axial length, taken in the direction parallel to the longitudinal axis, of the uncovered woven fabric screen available for separation between the zig-zag shaped lateral edges of the first and second annular support pieces is at least approximately identical at every location about a circumference of the woven fabric screen.

9. The water separation element according to claim 8, wherein
the first and second annular support pieces in a circumferential direction of the woven fabric screen are displaced relative to each other such that the free axial length of the woven fabric screen available for separation is approximately identical at every location about the circumference.

10. The water separation element according to claim 6, wherein
the first and second annular support pieces in a circumferential direction of the woven fabric screen are displaced relative to each other such that a free axial length of the woven fabric screen available for separation is approximately identical at every location about a circumference of the woven fabric screen.

11. The water separation element according to claim 1, further comprising
longitudinal stays introduced into the cylindrical woven fabric screen.

12. The water separation element according to claim 11, wherein
the longitudinal stays extend parallel to the longitudinal axis of the water separation element.

13. The water separation element according to claim 12, wherein
the longitudinal stays are integrated into the cylindrical woven fabric screen and are positioned in the radial direction of the cylindrical woven fabric screen inside a cylindrical envelope of the cylindrical woven fabric screen.

14. A filter device comprising
a water separation element according to claim 1 and comprising
a filter housing for receiving the filter element.

15. The filter device according to claim 14, wherein
the water separation element further comprises
a second annular support piece, arranged on and fixedly connected onto the second axial end of the cylindrical woven fabric screen,
wherein the second annular support piece is circumferentially closed and has an annular end having a zig-zag shaped lateral edge spaced axially away from the first and second axial ends and extending about a circumference of the cylindrical woven fabric screen;
wherein the zig-zag shaped lateral edge of the second annular support piece is composed of several assembled lateral edge sections, adjacent ones of the lateral edge sections extending at a non-zero angle relative to each other, and wherein the lateral edge sections extend at an angle not equal to 90 degrees relative to the longitudinal axis, to form the zig-zag shape of the zig-zag shaped lateral edge of the second annular support piece.

16. A filter element comprising:
a filter medium body; and a water separation element comprising:
- a cylindrical woven fabric screen for separating water, the cylindrical woven fabric screen surrounding and elongated along a longitudinal axis, the cylindrical woven fabric screen having a first axial end and a second axial end;
- wherein axial, as used herein, is a direction of the longitudinal axis;
- wherein radial, as used herein, is a direction transverse to the longitudinal axis;
- wherein the cylindrical woven fabric screen comprises woven fabric yarns positioned angularly relative to each other;
- a first annular support piece, arranged on and fixedly connected onto the first axial end of the cylindrical woven fabric screen,
- wherein the first annular support piece is circumferentially closed and has an annular end having a zig-zag shaped lateral edge spaced axially away from the first and second axial ends and extending about a circumference of the cylindrical woven fabric screen;
- wherein the zig-zag shaped lateral edge of the first annular support piece is composed of several assembled lateral edge sections, adjacent ones of the lateral edge sections extending at a non-zero angle relative to each other, and wherein the lateral edge sections extend at an angle not equal to 90 degrees relative to the longitudinal axis, to form the zig-zag shape of the zig-zag shaped lateral edge;
- wherein the cylindrical woven fabric screen is configured to be flowed through in a radial direction.

17. The filter element according to claim 16, wherein the water separation element further comprises
- a second annular support piece, arranged on and fixedly connected onto the second axial end of the cylindrical woven fabric screen,
- wherein the second annular support piece is circumferentially closed and has an annular end having a zig-zag shaped lateral edge spaced axially away from the first and second axial ends and extending about a circumference of the cylindrical woven fabric screen;
- wherein the zig-zag shaped lateral edge of the second annular support piece is composed of several assembled lateral edge sections, adjacent ones of the lateral edge sections extending at a non-zero angle relative to each other, and wherein the lateral edge sections extend at an angle not equal to 90 degrees relative to the longitudinal axis, to form the zig-zag shape of the zig-zag shaped lateral edge of the second annular support piece.

18. A filter device comprising a filter element according to claim 16 and comprising a filter housing for receiving the filter element.

19. The filter device according to claim 18, wherein
the water separation element of the filter element further comprises
- a second annular support piece, arranged on and fixedly connected onto the second axial end of the cylindrical woven fabric screen,
- wherein the second annular support piece is circumferentially closed and has an annular end having a zig-zag shaped lateral edge spaced axially away from the first and second axial ends and extending about a circumference of the cylindrical woven fabric screen;
- wherein the zig-zag shaped lateral edge of the second annular support piece is composed of several assembled lateral edge sections, adjacent ones of the lateral edge sections extending at a non-zero angle relative to each other, and wherein the lateral edge sections extend at an angle not equal to 90 degrees relative to the longitudinal axis, to form the zig-zag shape of the zig-zag shaped lateral edge of the second annular support piece.

* * * * *